(12) United States Patent
Bolt et al.

(10) Patent No.: US 7,181,950 B2
(45) Date of Patent: Feb. 27, 2007

(54) DEVICE FOR PROCESSING A THIN METAL FOIL

(75) Inventors: Pieter Jan Bolt, Duivendrecht (NL); Raymond Turk, Eindhoven (NL); Petrus Paulus H. Veltmans, Eindhoven (NL)

(73) Assignee: Nederlandse Organisatie voor toegepastnatuurwetenschappelijk Onderzoek TNO, Delft (NL)

( * ) Notice: Subject to any disclaimer, the term of this patent is extended or adjusted under 35 U.S.C. 154(b) by 0 days.

(21) Appl. No.: 10/543,518

(22) PCT Filed: Jan. 27, 2004

(86) PCT No.: PCT/NL2004/000059

§ 371 (c)(1),
(2), (4) Date: Dec. 1, 2005

(87) PCT Pub. No.: WO2004/067201

PCT Pub. Date: Aug. 12, 2004

(65) Prior Publication Data

US 2006/0144117 A1 Jul. 6, 2006

(30) Foreign Application Priority Data

Jan. 27, 2003 (NL) .................................. 1022506

(51) Int. Cl.
*B21D 37/12* (2006.01)

(52) U.S. Cl. ...................... 72/455; 72/465.1; 72/466.8; 100/214

(58) Field of Classification Search ............... 72/465.1, 72/466.6, 466.8, 45; 100/214, 296, 211; 493/468, 467; 793/480
See application file for complete search history.

(56) References Cited

U.S. PATENT DOCUMENTS

| 4,227,450 A | * | 10/1980 | Kreiskorte ................... 100/214 |
| 5,293,782 A | | 3/1994 | Long et al. .................... 74/25 |
| 5,315,890 A | | 5/1994 | Long ............................. 74/100 |

FOREIGN PATENT DOCUMENTS

DE          835 241          3/1952

* cited by examiner

*Primary Examiner*—Lowell A. Larson
*Assistant Examiner*—Debra Wolfe
(74) *Attorney, Agent, or Firm*—Norris McLaughlin & Marcus PA

(57) ABSTRACT

A device for processing a thin metal foil and provided with a frame plate (7) for a die (16), a guide plate (10) for a punch (11), and a guide arranging for the die (16) and the punch to cooperate in the desired manner for the purpose of processing a thin metal foil by the die and the punch. The guide consists of at least two hinge elements (8, 9), each connected by means of an elastic line hinge (4, 5) with both the frame plate and the guide plate, the line hinges allowing only a pivotal motion in substantially the rectilinear displacement. The frame plate, the guide plate and the guide are manufactured from a single block (1) of material, in which the frame plate, guide and guide plate connected by the elastic line hinges are formed by the provision of bores (3), slits (6) and/or recesses (2).

16 Claims, 2 Drawing Sheets

DEVICE FOR PROCESSING A THIN METAL FOIL

BACKGROUND OF THE INVENTION

The invention relates to a device for processing a thin metal foil and provided with a frame plate with receiving and fixing means for a die, a guide plate with receiving and fixing means for a punch, and a guide arranging for the die and the punch to cooperate in the desired manner upon displacement of the frame plate and the guide plate towards each other for the purpose of processing a thin metal foil by the die and the punch.

With such devices used in practice, it has been found that due to tolerance, stiffness and guiding problems, it is not possible, by means of punching and transforming, to process foils having a thickness of less than 40 µm. This lower limit originates from an inventory which the inventor has made in the Dutch metal processing industry. The problems referred to are caused by the inaccuracy of the conventional devices as a result of:

1. The sum of the various tolerances upon assembly of the device from its various parts, as, typically, at the least the frame plate, the guide, the guide plate and the product-specific punch and die. These parts, and elements from which the parts, such as the guide, are assembled, are all, depending on the selected manufacturing technology, subject to tolerances, which may enhance each other upon assembly.

2. The stiffness of the assembled device may, in the case of static and dynamic forces and vibrations arising through process forces and movements during the processing operation, have its influence in that an inaccuracy in the relative position of punch and die may then arise.

3. The displacement of the punch relative to the die implies displacement of parts relative to each other, which is accompanied by respective play adversely affecting the accuracy of the device.

4. The device is overdetermined, so that a thermal expansion can occur in a variety of directions. The thermal center is undefined and thus the device is thermally unstable.

As a result of all these factors, among others, there is, as mentioned, a lower limit of 40 µm for working foils by means of punching and transforming, which precludes a number of applications of the processing technique. Thus, when punching thin sheet, a cutting gap (the distance between the punch and the die) is required which, as a rule, is from 3 to 10% of the sheet thickness. This means that for punching a sheet of 20 µm a cutting gap of from 0.6 to 2 µm is required, which is often less than the accuracy of the processing device. All this means that partly due to the static and dynamic inaccuracy of the known devices, working thin foils is not possible, which constitutes an impediment to the use of this technique in mass manufacture, which is precisely what this technique is eminently suitable for.

BRIEF SUMMARY OF THE INVENTION

The object of the invention is to improve a device of the type described in the preamble, such that the above-mentioned problems are eliminated at least to such an extent that the device is also suitable for processing foils of a thickness of less than 40 µm.

This is achieved, according to the invention, if the guide is in the form of at least two hinge elements, which are each connected by means of an elastic line hinge with both the frame plate and the guide plate, the line hinges allowing only a pivotal motion in substantially the rectilinear displacement, while the frame plate, the guide plate and the guide are manufactured from a single block of material, in which the frame plate, guide and guide plate connected by the elastic line hinges are formed by the provision of through-going bores, slits and/or recesses. By manufacturing the whole device from a single block of material, all assembly and tolerance play has been eliminated in an extremely effective and adequate manner. The elastic hinges are present to enable the required displacement of the punch relative to the die. An elastic line hinge is here understood to mean a thin material connection of a certain width between two stiff parts. This enables pivotal motion in one direction, while the hinge connection is relatively stiff in the two directions perpendicular to that pivotal motion. Thus, not only all play and tolerances have been eliminated, but also a device is provided which pivots relatively smoothly in one direction and is stiff for the rest, which device is suitable for punching, deep-drawing and bending of products from sheet material having a thickness of, for instance, from 5 to 200 µm, where a high working accuracy is required.

According to a further embodiment of the invention, it is preferred that in each case two hinge elements are arranged mirror-symmetrically with respect to the rectilinear displacement. Due to the elastic line hinges being able not only to pivot but also to stretch—which then occurs uniformly due to the mirror-symmetrical arrangement of the identically designed hinge elements with elastic line hinges on both sides of the guide plate—it is also possible to accomplish a truly rectilinear displacement of the guide plate, while further a construction is obtained in which the heart of the punch and the die is the center of thermal expansion and thus the one-piece device has a defined thermal center.

In order to further promote the rectilinear displacement, it is preferred, according to a further embodiment of the invention, that not only in each case two hinge elements are arranged mirror-symmetrically with respect to the rectilinear displacement, but additionally in each case at least two hinge elements are arranged mutually parallel, spaced apart from each other in the rectilinear displacement. Thus, in the event of a displacement force deviating from the desired direction of displacement, the possibility of the guide plate tilting is prevented in that the hinge elements extend substantially transversely to the rectilinear displacement. It is incidentally noted that it is also possible that on just one side of the guide plate two or more mutually parallel hinge elements are present, albeit that this entails a slight deviation from the straight line upon movement in the direction of displacement in that the elastic line hinges can then be stretched less easily.

Further, it is possible according to the invention that more than two hinge elements are arranged rotation-symmetrically around the rectilinear displacement. The hinge elements then extend in the form of a cross or a star with respect to the center of the punch and the die, with all the above-discussed advantageous properties of the device being preserved.

A simple and efficiently working device is obtained if the hinge elements control the rectilinear displacement as a parallelogram linkage, in which case, at least in the starting position of the device, it is preferred that the hinge elements extend substantially transversely to the rectilinear displacement.

To enable the die to be placed in a suitable and accurate manner, it is preferred, according to a further embodiment of the invention, that the receiving means for the die in the frame plate are in the form of a tubular through-opening which extends in the direction of the rectilinear displacement, in which the die can be locked by fixing means. The die can then be inserted and fixed in the device from below. Similarly, the punch can be placed into the device from above, if the receiving means for the punch in the guide plate are in the form of a tubular through-opening which extends in the direction of the rectilinear displacement, in which the punch can be locked by fixing means. In this way, notwithstanding the one-piece design of the device, placing the punch as well as the die can be carried out fast and readily. The accuracy can then be additionally promoted if the tubular opening for the die has a cross section that is equal to, and is situated in line with, the tubular opening for the punch, in particular if it is considered here that owing to the device being in one piece the receiving means can be realized in one continuous processing operation.

In order to effect an easy sliding-in of the die as well as an accurate positioning thereof relative to the frame plate, it may be provided, according to a further embodiment of the invention, that the fixing means for the die in the frame plate comprise a through-slit extending in the direction of the tubular opening, as well as at least one locking member, such as a bolt, with which a force can be exerted, which can press a portion of the frame plate situated between the tubular opening and the slit towards the tubular opening. Thus, a tubular opening can be provided in which the die is slidable with a loose fit, whereupon, by pressing on the die from one side, always an accurately defined clamping can be obtained.

Similarly, the punch can be mounted if the fixing means for the punch in the guide plate comprise a through-slit extending in the direction of the tubular opening, as well as at least one locking member, such as a bolt, with which a force can be exerted which can press a portion of the guide plate situated between the tubular opening and the slit towards the tubular opening, in which case, for an accurate positioning of the die and the punch relative to each other, it is preferred that the through-slit in the frame plate and the through-slit in the guide plate are situated in line with each other. This embodiment provides the further advantage that the two slits can be provided in the block of material in one pass.

In order for the punch and the die to be always positioned in the same, correct and desired manner, it is preferred, according to a further embodiment of the invention, that the tubular opening has a cross section which has substantially the shape of a triangle with rounded angles, and more specifically, that the triangle is an isosceles or equilateral triangle with a base extending substantially parallel to the slit. When being clamped, the die and the punch are then always brought to the same abutment position by the sides of the triangle.

The device is manufactured from a single block of material, which has such elastic properties as to allow the elastic line hinges to be formed, while on the other hand the portions of the device contiguous to the elastic line hinges are to be sufficiently stiff and rigid. In this connection, it is preferred that the block of material is made of metal.

BRIEF DESCRIPTION OF THE DRAWINGS

Referring to embodiments represented in the accompanying drawings, the device according to the invention will presently be further elucidated, though exclusively by way of non-limiting example.

In the drawing.

DETAILED DESCRIPTION OF THE INVENTION

Figure 1:
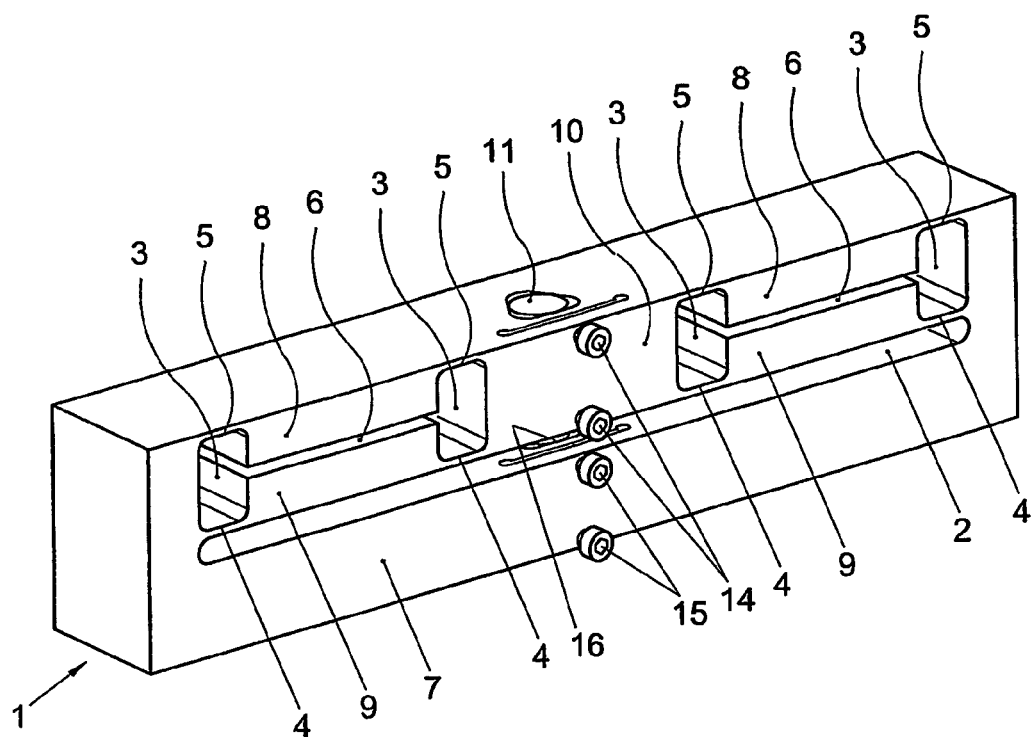
FIG. 1 shows, in perspective view, a first embodiment of the device according to the invention.

The device represented in FIG. 1 for working a thin metal foil is manufactured from a rectangular block of metal 1, in which is provided a long recess 2 passing through the block 1, extending in horizontal direction. At a short distance above the recess 2, and extending perpendicularly thereto, four slotted through-holes 3 are provided, in such a manner that between each slotted hole 3 and the recess 2 an elastic line hinge 4 in the form of a thin metal strip remains. The slotted holes 3 have a height such that at the top of the block 1, likewise four elastic line hinges 5 are formed. The slotted holes 3 are connected in pairs by a slit 6 extending horizontally, approximately halfway the height of the slotted holes 3. Thus, a U-shaped frame plate 7 has been obtained, of which the two vertically upwardly extending legs are each connected via an elastic line hinge 4 and 5, respectively, with a hinge element 9 and 8, respectively, which in turn are each connected via an elastic line hinge 4 and 5, respectively, with a guide plate 10. In this way, the guide plate 10 is suspended from the vertically upwardly extending legs of the frame plate 7 by way of a guide in the form of four hinge elements 8 and 9 which are active as a parallelogram linkage.

Figure 2:
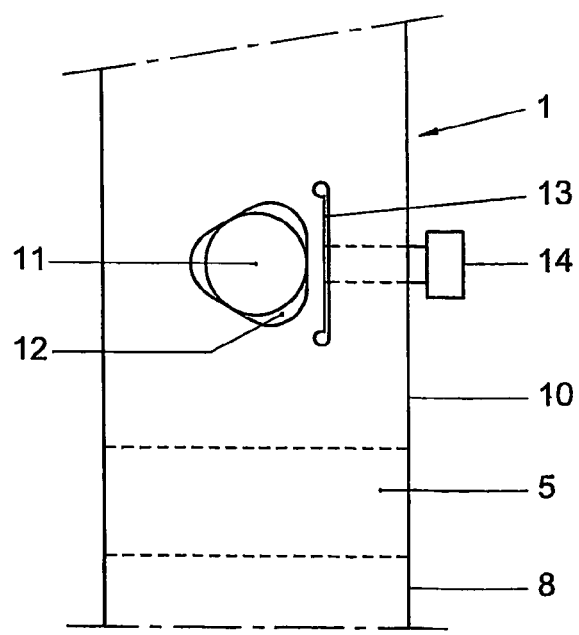
FIG. 2 shows, in top plan view, on an enlarged scale, a receiving and fixing mechanism for a punch or a die, as used in FIG. 1.

In the guide plate 10, a punch 11 is fixed in a manner which is further elucidated with reference to FIG. 2.

In the guide plate 10 of the block 1, there is situated, perpendicular to the upper side thereof, a tubular through-opening 12 having a cross section whose shape could be generally designated as an isosceles triangle with rounded angles. In the present exemplary embodiment, the tubular opening 12 has been obtained by first drilling a round hole, in which a shank forming part of the punch 11 can be inserted with a loose fit. Next, three bores each having a lesser diameter than the round hole have been provided eccentrically and rotation-symmetrically with respect to the centerline of that round hole, and more specifically in such a manner that the round hole is provided with three bulges, so that the substantially triangular shape is obtained, which shape is composed of the three circular arcs of the three bores each alternated with one of the three circular arcs of the round hole that remain after the provision of the three bores. One of the sides of the thus formed, substantially triangular, tubular opening 12 runs parallel to the front face of the guide plate 10. Parallel to that side, a slit 13 is provided in the guide plate 10, while two bolts 14 reach screw-wise from the front face of the guide plate 10 through the guide plate 10 and the slit 13, butting against a wall of the slit 13. The shank forming part of the punch 11 can be fixed in the tubular opening 12 by deforming, by way of the bolts 14, the material portion between the slit 13 and the tubular opening 12, such that said material portion presses the shank securely against the two mutually converging walls of the tubular opening 12, more particularly against two remaining circular arcs of the round hole. It is noted that the walls of the tubular opening may also be formed or worked so as to form a straight surface, so that fixation takes place in a locating-and-centering fashion, albeit that this entails higher stresses owing to a line contact between shank and mutually converging walls.

Similarly, with bolts 15, a die 16 can be fixed in the frame plate 7, which is provided for that purpose with a tubular opening that is identical to, and is situated in line with, the tubular opening 12 in the guide plate 10, while the frame plate 7 is further provided with a slit to enable a shank forming part of the die 16 to be fixed by means of the bolts 15 in the frame plate 7 in a manner as described in the preceding paragraph.

The tubular openings for receiving and fixing the punch and the die can be provided in a single pass. The two tubular openings can be made of mutually identical design, as regards their cross section, so that they are not only situated accurately in line with respect to each other, but also exert an identical locating-and-centering effect on the shanks of the punch and the die.

In the manufacture of the above-described device, preferably, first a rectangular block of metal is annealed stress-free and made right-angled and parallel as to the main dimensions. Also, it is preferred to provide the receiving and fixing means before the block is processed for forming the frame plate, hinge elements and guide plate connected through elastic line hinges.

For processing a thin metal foil, after mounting the punch and the die and interpositioning the metal foil to be processed, the guide plate 10 is pressed vertically downwards in the direction of the frame plate 7 by means not further shown. This displacement is enabled by the pivotal motion of the hinge elements 8 and 9 about their elastic line hinges 4 and 5, and the elongation of those hinges through stretching. Owing to the symmetrical design of the hinge elements 8 and 9 and the thus generated guidance by, in each case, a parallelogram guide of each pair of hinge elements 8 and 9, the guide plate 10 is guided accurately perpendicularly downwards. Due to the whole device being of one-piece design, it is insensitive to play and inaccuracies caused by accumulation of various manufacturing tolerances. Expansions resulting from temperature changes, which may be caused by the actual processing operations to be carried out, do not influence the accuracy of the device, because they are then uniformly distributed owing to the symmetrical construction with a defined thermal center in the heart of the punch and the die, that is, the punch and the die do not shift relative to each other in the horizontal plane.

Figure 3:
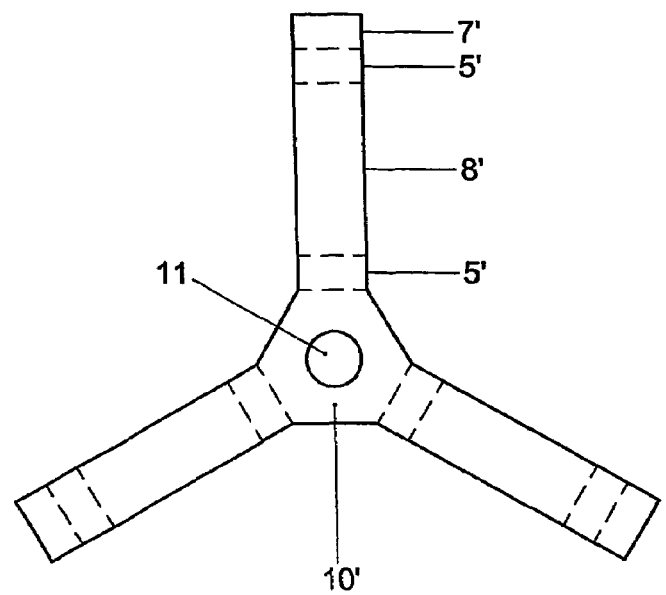
FIG. 3 shows, in top plan view, a second embodiment of the device according to the invention.

FIG. 3 shows in top plan view a device in which a guide plate 10', in which a punch 11 is received and fixed, is supported rotation-symmetrically by three guide parts with hinge elements 8', which are coupled via elastic line hinges 5' with, on the one hand, the guide plate 10' and, on the other, a frame plate 7'. The rotation-symmetrical suspension of the guide plate 10' promotes the truly straight guidance in vertical direction thereof, in that tilting of the guide plate 10' about a horizontal axis is effectively prevented. Such tilting is prevented in the embodiment according to FIG. 1 by forming a parallelogram with, in each case, two hinge elements situated above each other. In the embodiment according to FIG. 3, the twin design of the hinge elements in vertical direction can be omitted because of the star-shaped arrangement of the guide.

Figure 4:
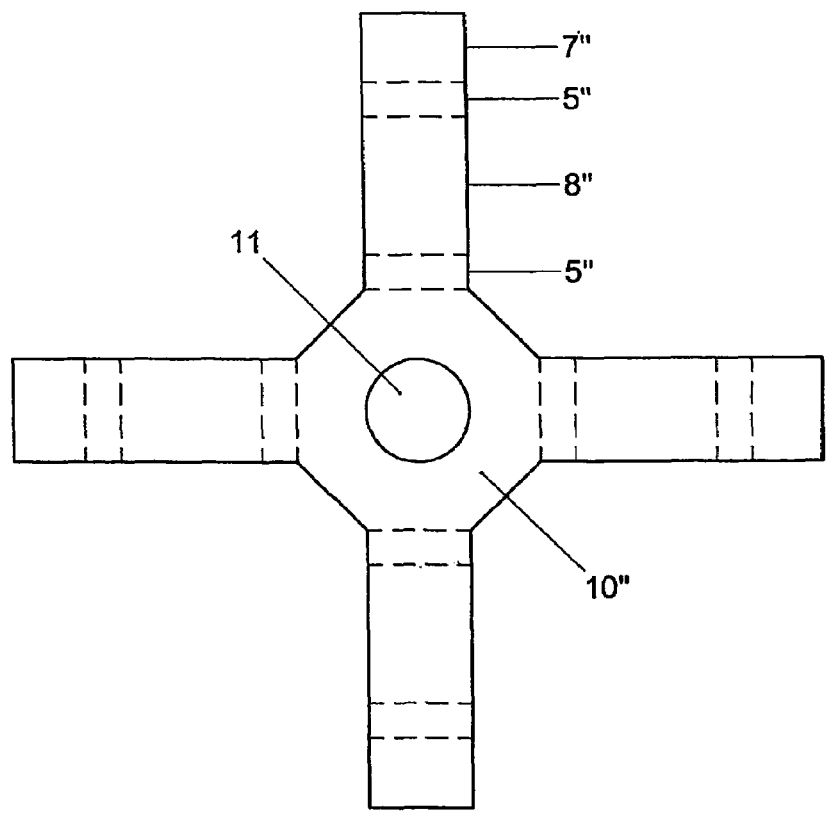
FIG. 4 shows, in top plan view, a third embodiment of the device according to the invention.

FIG. 4 shows, in top plan view, a device which is in the form of a cross, in that a guide plate 10", in which a punch 11 is accommodated and locked, is supported by four hinge elements 8" mutually staggered through 90°, which, in the manner already described above, are coupled by a respective elastic line hinge 5" with, on the one hand, the guide plate 10" and, on the other hand, upstanding legs of a frame plate 7". In this device, too, one hinge element per guide can suffice.

It is evident that within the framework of the invention as laid down in the appended claims many other modifications and variants are possible. The possibility of just one hinge element per guide position has already been pointed out. Naturally, more than two hinge elements may be present at each guide position. In the exemplary embodiments, the hinge elements are represented in a horizontal position, which may be regarded as an unloaded starting position. In that position, the hinge elements can also have a position deviating from a horizontal position. Mention has been made of the guide plate being pressed towards the frame plate for the purpose of processing a thin metal foil. It is also possible to use the device the other way around, in which case the guide plate is stationarily supported and the frame plate is pressed down in the direction of the guide plate. Although with regard to the material of the block a preference has been expressed for metal, other materials may be eligible for that purpose, such as a specific plastic which may or may not be reinforced. Further, the die and the punch can also be accommodated and fixed in the frame plate and the guide plate in a different manner, for instance through direct engagement of the die or the punch by clamping members.

The invention claimed is:

1. A device for processing a thin metal foil and provided with
   a frame plate with receiving and fixing means for a die,
   a guide plate with receiving and fixing means for a punch, and
   a guide arranging for the die and the punch to cooperate in the desired manner upon displacement of the frame plate and the guide plate towards each other for the purpose of processing a thin metal foil by the die and the punch,
characterized in that the guide is in the form of at least two hinge elements, which are each connected by means of an elastic line hinge with both the frame plate and the guide plate, the line hinges allowing only a pivotal motion in substantially the rectilinear displacement, while the frame plate, the guide plate and the guide are manufactured from a single block of material, in which the frame plate, guide and guide plate connected by the elastic line hinges are formed by the provision of through-going bores, slits and/or recesses.

2. A device according to claim 1, characterized in that in each case two hinge elements are arranged mirror-symmetrically with respect to the rectilinear displacement.

3. A device according to claim 1, characterized in that in each case at least two hinge elements are arranged mutually parallel, spaced apart from each other in the rectilinear displacement.

4. A device according to claim 1, characterized in that more than two hinge elements are arranged rotation-symmetrically around the rectilinear displacement.

5. A device according to claim 1, characterized in that the hinge elements control the rectilinear displacement as a parallelogram linkage.

6. A device according to claim 5, characterized in that the hinge elements extend substantially transversely to the rectilinear displacement.

7. A device according to claim 1, characterized in that the receiving means for the die in the frame plate are in the form of a tubular through-opening extending in the direction of the rectilinear displacement, in which the die can be locked by fixing means.

8. A device according to claim 1, characterized in that the receiving means for the punch in the guide plate are in the form of a tubular through-opening extending in the direction of the rectilinear displacement, in which the punch can be locked by fixing means.

9. A device according to claim 7, characterized in that the tubular opening for the die has a cross section equal to and situated in line with the tubular opening for the punch.

10. A device according to claim 7, characterized in that the fixing means for the die in the frame plate comprise a through-slit extending in the direction of the tubular opening, as well as at least one locking member, such as a bolt, with which a force can be exerted which can press a portion of the frame plate situated between the tubular opening and the slit towards the tubular opening.

11. A device according to claim 7, characterized in that the fixing means for the punch in the guide plate comprise a through-slit extending in the direction of the tubular opening, as well as at least one locking member, such as a bolt, with which a force can be exerted which can press a portion of the guide plate situated between the tubular opening and the slit towards the tubular opening.

12. A device according to claim 10, characterized in that the through-slit in the frame plate and the through-slit in the guide plate are situated in line with each other.

13. A device according to claim 7, characterized in that the tubular opening has a cross section which has substantially the shape of a triangle with rounded angles.

14. A device according to claim 13, characterized in that the triangle is an isosceles triangle with a base extending substantially parallel to the slit.

15. A device according to claim 13, characterized in that the triangle is equilateral.

16. A device according to claim 1, characterized in that the block of material is made of metal.

* * * * *